Sept. 15, 1964 R. M RAVANESI 3,149,205

RESONANT TRANSFER CIRCUIT THAT UTILIZES A COMMON CONSTANT LENGTH TRANSMISSION LINE

Filed Aug. 7, 1961 2 Sheets-Sheet 1

INVENTOR.
Ralph M. Ravanesi

BY C. A. Gulbrandsen
Atty.

INVENTOR.
Ralph M. Ravanesi
BY
Atty.

United States Patent Office 3,149,205
Patented Sept. 15, 1964

3,149,205
RESONANT TRANSFER CIRCUIT THAT UTILIZES A COMMON CONSTANT LENGTH TRANSMISSION LINE

Ralph M. Ravanesi, Melrose Park, Ill., assignor to Automatic Electric Laboratories, Inc., Northlake, Ill., a corporation of Delaware Filed Aug. 7, 1961, Ser. No. 129,761
11 Claims. (Cl. 179—15)

This invention relates to high speed information handling systems, and more particularly, it relates to signal transfer circuits for transferring signals between pairs of communication terminals in said systems.

High speed information handling systems employing time sharing or time division multiplexing in transferring information between communication terminals over a common transmission link are well known. In such systems, since each pair of terminals in communication with each other is assigned a cyclically recurring discrete time slot during which information may be transferred, a signal transfer circuit which will permit the complete transfer of information during this time slot assigned and which will completely obstruct the transfer of information at other times must be provided. This transfer of information must also be accomplished with the minimum loss possible in order to eliminate or at least substantially reduce the number of amplification components required in the individual communication channels.

In prior systems, resonant transfer circuits comprising a pair of low pass filter networks with shunt capacitance connected by a high speed gating circuit have been used to transfer signals between two terminals. These signals are stored in the shunt capacitance of the input lead low pass filter, and upon closing the gate, these signals are transferred through the gate to a shunt capacitance in the output lead low pass filter. A charged capacitance connected in this manner to a similar uncharged capacitance normally results in a sharing of the charges between them. In order to completely transfer the charge on the one capacitor to the other capacitor, one-half cycle of the resonant frequency of the inductance-capacitance circuit is determined to be precisely equal to the length of the time slot. Thus, in one-half cycle the charge on the input capacitance is transferred to the output capacitance. Timing of the gating circuit is such that the gate is opened at the instant of current reversal, thus preventing any return flow.

A number of difficulties have been encountered in the use of this type of transfer circuit. For example, in a large capacity system where there are a large number of communication terminals connected to the common transmission link the effective length of the common transmission link varies depending upon which ones of the communication terminals are simultaneously connected to the transmission link. This is due to the fact that the resonant inductor used in these systems must of necessity be of a low value. A slight change in the physical length of the common transmission link therefore causes the resonant inductance to vary, due to the increase or decrease in the inductance of the link, and consequently the effective length of the common transmission link, thus giving a varying loss from one communication terminal to another.

Another difficulty encountered is due to the large current flowing through the gates during the time slot when the signals are being transferred. The switches must of necessity, therefore, be of very low resistance to reduce the power dissipated in the gates.

It is the principal object of this invention to provide a new and improved signal transfer circuit which overcomes these prior difficulties.

The invention is described embodied in a telephone system, however, it is to be understood that the invention is not limited to use in a telephone system and may be used in other types of high speed information handling systems.

In accordance with this invention as described in the disclosed embodiment, a plurality of subscriber lines, each of which includes a filter network and a signal transfer circuit comprising inductance means and capacitance means, are connected to the time-shared common transmission line. A transmission gate terminates each of the subscriber lines, and is normally operated and in a low impedance state effectively short circuiting the connection of the lines to the common transmission line. During the interval preceding the time slot assigned to a calling and called line, the information to be transferred is stored in the inductance means of the signal transfer circuit included in the calling line. The transmission gates associated with these lines are switched to a high impedance state during the assigned time slot and the stored signals are transferred to the inductance means of the signal transfer circuit included in the called line. The signals are transferred over the common transmission link including the transmisison gates associated with the other ones of the subscriber lines thus the transmission gates form an integral part of the common transmission line. It is in this respect, that the signals are stored in the inductance included in the calling line and are transferred to the inductance included in the called line through the medium of the common transmission line including the transmission gates associated with the other ones of the lines, that this invention is unique.

In accordance with the above-described aspect of this invention, the inductance and capacitance comprising the signal transfer circuits included in a calling and a called line form a resonant circuit having a resonant frequency of such a value that one-half cycle is precisely equal to the length of the time slot assigned to a calling and a called line. The transmission gates are switched to the high impedance state only for the length of the time slot and are switched again to the low impedance state at the end of the time slot thereby preventing the signals transferred from returning to the inductance included in the calling line. In this respect, since each of the transmission gates forms an integral part of the common transmission line and the signals transferred flow through each of the transmission gates, other than the transmission gates associated with the calling and the called lines, the effective length of the common transmission line always will remain constant regardless of which two of the subscriber lines are simultaneously connected to the common transmission line.

It is a feature of this invention that each of the transmission gates associated with the subscriber lines is normally in a low impedance state effectively short circuiting the connection to the common transmission line.

It is a further feature of this invention that the signals to be transferred are stored in the inductance means included in the calling line and are transferred to the inductance means included in the called line.

It is a further feature of this invention that the inductance and capacitance included in the called and calling lines form a resonant circuit.

It is a still further feature of this invention that the signals transferred flow through the transmission gates associated with all of the subscriber lines connected to the common transmission, except the transmission gates associated with the calling and called subscriber lines.

These and other features not specifically mentioned may be more clearly understood by reference to the following drawings in which.

Figure 1:
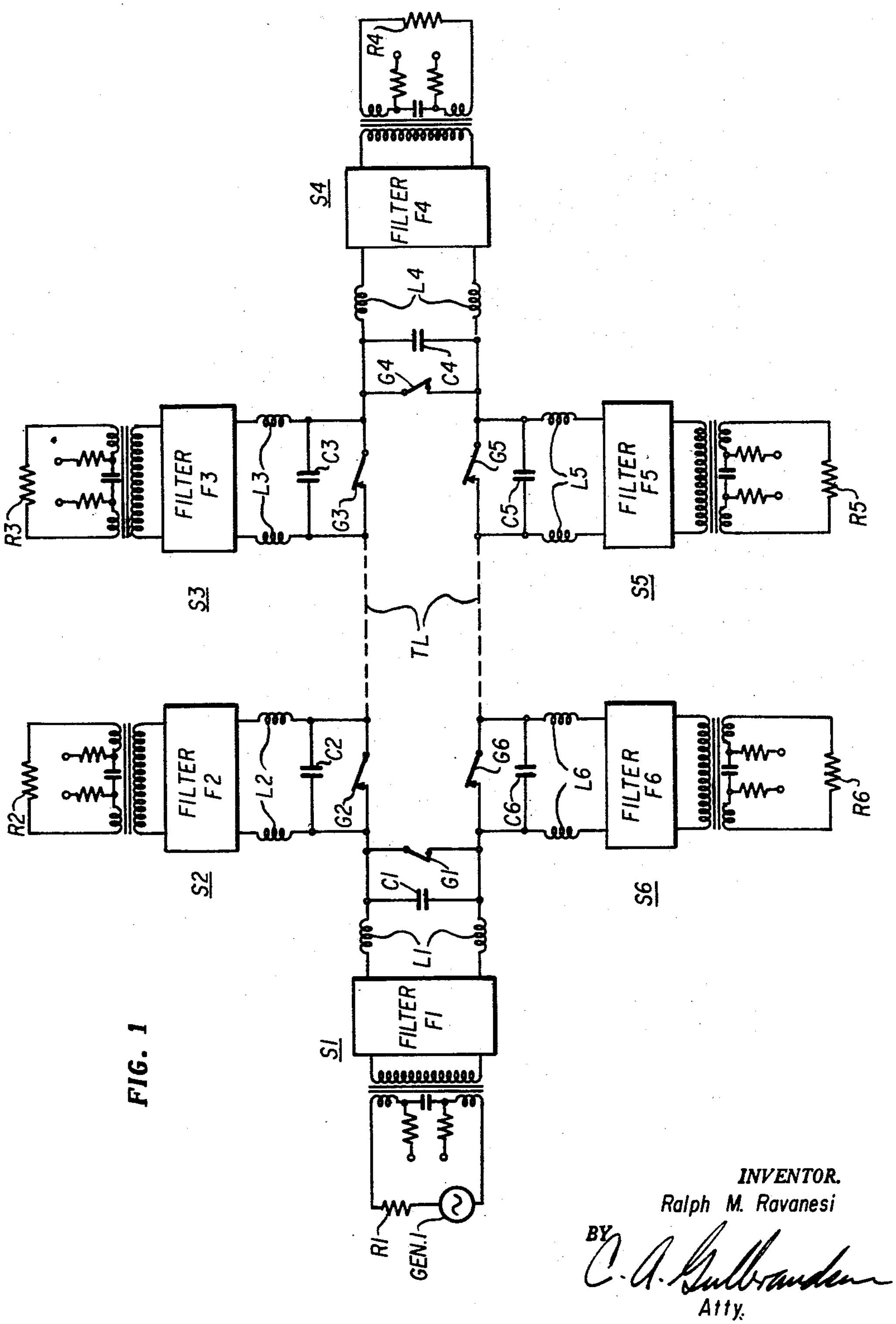
FIGURE 1 is a block diagram schematic of one embodiment wherein a plurality of subscriber telephone lines are connected to a time-shared common transmission line.

Referring now to FIGURE 1 which is illustrative of one specific embodiment of this invention, a number of subscriber lines S1–S6 are shown connected to a common transmission line TL. It may be noted that one or more of the illustrated subscriber lines could equally as well be link circuits, or trunk circuits extending to adjacent exchange areas. Furthermore, it is to be understood that a larger number of subscriber lines, or link circuits, or trunk circuits, could be connected to the common transmission line TL and that the subscriber lines S1–S6 are shown only for the purpose of illustrating the invention.

The subscriber lines S1–S6, each of which includes a filter and a signal transfer circuit comprising a pair of inductors and a capacitor, is shunt connected to the common transmission line by a transmission gate, for example, the subscriber line S1 shunt connected to the common transmission line by the transmission gate G1 includes the filter F1 and the signal transfer circuit comprising the pair of inductors L1 and the capacitor C1. A substation, represented by the resistances R1–R6, respectively, is coupled to each of the subscriber lines by means of a repeat coil.

The transmission gates are designed to meet the requirement of alternate states of zero impedance and infinite impedance to current flow in either direction. These transmission gates are normally operated and in the zero impedance state thus effectively short circuiting the subscriber lines S1–S6. It may also be noted that each of the transmission gates G1–G6 forms an integral part of the transmission line TL.

Figure 2:
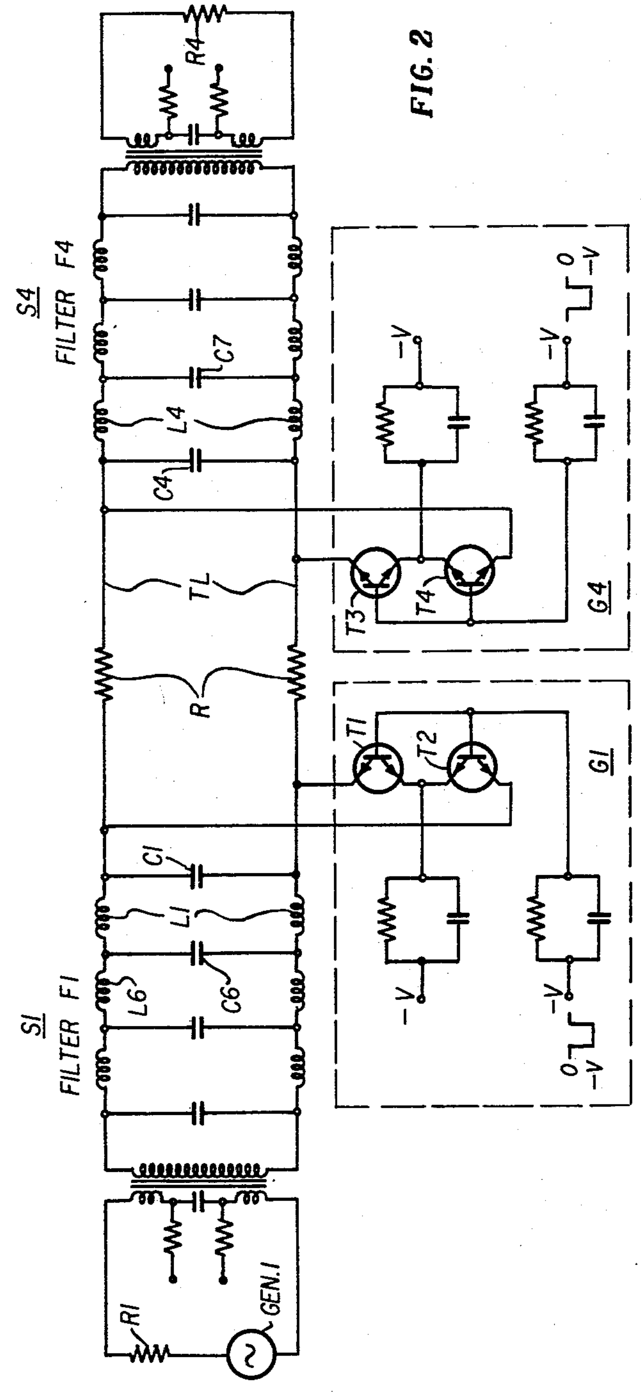
FIGURE 2 is a schematic diagram of two of the subscriber lines represented as a calling and a called line.

The novelty of this invention may be better understood by referring to FIG. 2 which shows two of the subscriber lines, specifically subscriber lines S1 and S4, and their associated transmission gates, gates G1 and G4, in greater detail. The elements included in these lines are numbered the same as in FIG. 1. Furthermore, the explanation of these elements is equally true for the elements included in each of the other subscriber lines which may be connected to the common transmission line.

The filters F1 and F4 are low pass, balanced filters designed to operate with short circuit terminations and to attenuate signals outside the voice frequency range. They are comprised of well known filter elements, primarily sections of series inductors and shunt capacitors to produce the required cut-off characteristics. The capacitors terminating the filters are of the large value as compared to the capacitors included in each of the signal transfer circuits, for example, capacitor C6 is large compared to the capacitor C1, so as to be effectively short circuited when the transmission gates are opened.

The transmission gates G1 and G4 each comprise a pair of bilateral transistors T1–T2 and T3–T4, respectively, connected back-to-back in shunt with the subscriber lines S1 and S4. These transistors normally are biased for conduction, that is, the base electrodes are biased positive with respect to the emitter electrodes, and in a low impedance state effectively short circuiting the subscriber lines. The transmission gates associated with all of the other subscriber lines connected to the common transmission line TL are also operated and in a low impedance state. The total impedance of all of these other transmission gates are represented by the resistances R shown connected in the common transmission line TL. These transmission gates are intended to be merely representative of the type of transmission gates which may be used. Any type of transmission gate capable of operating and having the characteristics previously and hereinafter defined will function equally as well.

Assuming now that the subscriber line S1 is calling the subscriber line S4, the signals generated by the signal generator GEN 1 are coupled through the repeat coil to the filter F1. The transmission gate G1 is normally operated and in a low impedance state, that is, transistors T1 and T2 are conducting, effectively short circuiting the capacitor C1 and the connection to the common transmission line. The signal currents passed by the filter F1 will circulate through the inductors L1 since the capacitor C1 is short circuited providing a short circuit termination for the filter, and the signal energy will be stored in the inductors L1.

During the length of the time slot assigned to the subscriber lines S1 and S4, a negative pulse is coincidentally applied to the base electrodes of the bilateral transistors T1–T2 and T3–T4 of the transmission gates G1 and G4 rendering them nonconductive. The transmission gates G1 and G4 are thereby switched to a high impedance state and the effective short circuit connections across the capacitors C1 and C4 and the connections to the common transmission line are removed.

Figure 3:
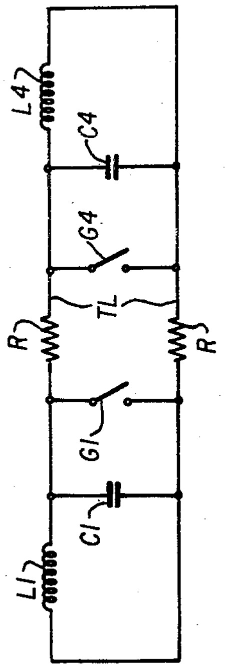
FIGURE 3 shows the equivalent circuit of the calling and called lines during a time slot when the transmission gates are in a high impedance state allowing the stored signals to be transferred.

FIG. 3 shows the equivalent circuit during the time slot. In this figure, the capacitors C6 and C7 which are, as previously explained, relatively large valued capacitors may be considered as short circuits, and are represented as such, and the inductors L1 and L4, comprising the signal transfer circuits included in the lines S1 and S4 are represented as a single inductor. The signals stored in the inductor L1 are transferred to the inductor L4 by means of the resonant circuit formed by the inductors L1 and L4 and the capacitors C1 and C4. A period of resonance with the inductors L1 and L4 is determined to be precisely equal to twice the length of a time slot thus in one half cycle all of the energy stored in the inductors L1 will be transferred to the inductor L4. At the end of the time slot assigned to the subscriber lines S1 and S4 the base electrodes of the bilateral transistors T1–T4 of the transmission gates G1 and G4 are again biased positive with respect to the emitters and the transistors are again rendered conductive thereby switching the transmission gates to the low impedance state effectively short circuiting the connections and preventing any signals from being returned to the inductor L1.

It may be noted that since the transmission gates associated with all of the other subscriber lines connected to the common transmission line TL form an integral part of the transmission line, the stray capacitance resulting from the common transmission line and the transmission gates associated with the calling and called lines is generally constant and does not vary. Furthermore, this capacitance may be tolerated in the present invention and does not have the detrimental effect which a slight change of inductance has in the prior systems. This capacitance may simply be treated as a part of the resonant capacitance, for example, capacitor C1, and the resonant capacitor may be adjusted accordingly to establish the required resonant frequency. It may aslo be noted that by designing the transmission gates and the common transmission line to have the proper value of capacitance, the capacitors C1 and C4 could both be eliminated.

What is claimed is:

1. A communication system comprising: a transmission line; a plurality of communication terminals connected to said transmission line; signal transfer means included in each of said terminals of said plurality; gating means individual to each said terminal interposed between each of said signal transfer means and said transmission line normally in a low impedance state to effectively short circuit said signal transfer means; means storing signals in said signal transfer means included in one of said terminals; and means for switching said gating means associated with said one and another one of said terminals to a high impedance state thereby rendering said signal transfer means operative to transfer said stored signals to said other terminal.

2. A communication system, as claimed in claim 1, wherein each of said signal transfer means includes inductance means and capacitance means, said inductance means and capacitance means included in said one and said other one of said terminals forming a resonant circuit for transferring said signals.

3. A communication system, as claimed in claim 2, wherein said signals are stored in said inductance means included in said one of said terminals, and transferred to said inductance means included in said other one of said terminals.

4. A communication system, as claimed in claim 2, wherein said means for switching said gating means to a high impedance state is operated to switch said gating means for a period equivalent to one-half cycle at the resonant frequency of said resonant circuit.

5. A signal transfer circuit of the resonant-transfer type comprising, in combination, a first series resonant circuit including first inductance means, a second series resonant circuit including second inductance means, conductor means connecting said first and second series resonant circuits, first normally open, gating means connected in parallel with said first series resonant circuit, second normally open gating means connected in parallel with said second series resonant circuit; and means closing said first and second gating means only for a period sufficient to transfer signals stored in said first inductance means to said second inductance means.

6. A communication system comprising: a plurality of communication terminals each including a filter network, inductance means, and capacitance means; a transmission line common to said plurality of terminals; a calling and a called terminal included in said plurality of terminals; means storing signals in said inductance means included in said calling terminal, said inductance and capacitance mens included in said calling and called terminals forming a resonant circuit for transferring said signals to said inductance means included in said called terminal; gating means connecting each of said plurality of terminals to said transmission line, said gating means normally in a low impedance state effectively short circuiting said connections; and means for switching said gating means associated with said calling and called terminals to a high impedance state to remove said effective short circuit connection for a period sufficient to transfer said signals to said inductance means included in said called terminal.

7. A communication system, as claimed in claim 6, wherein said filter networks are balanced filters terminated with a capacitor having a large value as compared to said first-mentioned capacitance means included in each of said terminals and of such value as to effectively short circuit said filter networks during the period said gating means associated with a terminal is in said high impedance state.

8. A communication system comprising: a transmission line; a plurality of communication terminals connected to said transmission line; signal transfer means included in each of said terminals of said plurality; gating means individual to each of said terminals in said plurality normally in a low impedance state effectively short circuiting said signal transfer means and normally forming an integral part of said transmission line; means storing signals in said signal transfer means included in a calling one of said terminals; and means for switching said gating means associated with said calling terminal and a called one of said terminals to a high impedance state removing said effective short circuit on said signal transfer means and rendering said signal transfer means operative to transfer said stored signals through the medium of said transmission line including all of said transmission gates in said low impedance state to said called terminal.

9. A communication system comprising: a transmission line; a plurality of communication terminals connected to said transmission line; inductance means included in each of said terminals of said plurality; capacitance means connected to each of said inductance means forming resonant circuits; gating means individual to each of said terminals in said plurality normally in a low impedance state effectively short circuiting said capacitance means and normally forming an integral part of said transmission lines; means storing signals in said inductance means included in a calling one of said terminals; and means for switching said gating means associated with said calling terminal and a called one of said terminals to a high impedance state removing said effective short circuit on said capacitance means, said signals stored in said inductance means in said calling terminal transferred through the medium of said transmission line including all of said gating means in said low impedance state to said inductance means in said called terminal.

10. A communication system comprising: a time-shared transmission line; a plurality of calling communication terminals and a plurality of called communication terminals connected to said transmission line, each pair of calling and called terminals having assigned thereto a cyclically recurring discrete time slot in a plurality of time slots during which signals may be transferred therebetween; inductance means included in each of said terminals of said plurality, capacitance means connected to each of said inductance means; means storing signals in said inductance means included in said calling terminals; gating means normally in a low impedance state effectively short circuiting the connection of said plurality of calling and called terminals; and means for coincidentally switching said gating means associated with said calling and said called terminals to a high impedance state only during the time slot assigned to remove said short circuit across said connections to transfer said signals stored in said inductance means in said calling terminals to said inductance means included in said called terminals.

11. A communication system, as claimed in claim 10, wherein said inductance means and capacitance means included in a calling terminal and a called terminal forms a resonant circuit which has a period equal to twice the length of a time slot whereby during a time slot all of said signals stored in said inductance means in said calling terminal are transferred to said inductance means included in said called terminal.

References Cited in the file of this patent

UNITED STATES PATENTS

| | | |
|---|---|---|
| 2,917,583 | Burton et al. | Dec. 15, 1959 |
| 2,962,551 | Johannesen | Nov. 29, 1960 |